US008543312B2

(12) United States Patent
Lee

(10) Patent No.: US 8,543,312 B2
(45) Date of Patent: Sep. 24, 2013

(54) SYSTEM FOR CONTROLLING CONTINUOUS VARIABLE VALVE LIFT ACTUATOR OF DIESEL ENGINE, AND METHOD THEREOF

(75) Inventor: Jong Won Lee, Gunpo (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 918 days.

(21) Appl. No.: 12/623,160

(22) Filed: Nov. 20, 2009

(65) Prior Publication Data
US 2010/0313862 A1 Dec. 16, 2010

(30) Foreign Application Priority Data
Jun. 12, 2009 (KR) .................. 10-2009-0052494

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC ............ 701/103; 123/676; 123/679; 123/435

(58) Field of Classification Search
USPC ............. 701/103, 109; 123/90.15, 316, 345, 123/346, 347, 348, 435, 568.14, 672, 676, 123/679, 698; 60/276, 285
See application file for complete search history.

(56) References Cited

U.S. PATENT DOCUMENTS

| 4,305,352 A * | 12/1981 | Oshima et al. ............. 123/90.15 |
| 6,405,122 B1 * | 6/2002 | Yamaguchi .................. 701/106 |
| 8,209,110 B2 * | 6/2012 | Weber et al. .................. 701/109 |
| 8,360,040 B2 * | 1/2013 | Stewart et al. ............... 123/672 |
| 2003/0160455 A1 * | 8/2003 | Hu et al. ..................... 290/40 C |
| 2008/0264036 A1 * | 10/2008 | Bellovary ...................... 60/274 |
| 2009/0070015 A1 * | 3/2009 | Rayl ............................ 701/105 |
| 2009/0139210 A1 * | 6/2009 | Sanchez ........................ 60/276 |
| 2010/0018483 A1 * | 1/2010 | He et al. .................... 123/90.15 |

FOREIGN PATENT DOCUMENTS
JP 2003-148225 A 5/2003

* cited by examiner

Primary Examiner — Willis R Wolfe, Jr.
Assistant Examiner — Anthony L Bacon
(74) Attorney, Agent, or Firm — Morgan, Lewis & Bockius LLP

(57) ABSTRACT

A system for controlling a continuous variable valve lift actuator of a diesel engine and a method thereof stabilize exhaust gas and improve performance by variably controlling lift and timing of intake and exhaust valves based on combustion state and driving purpose. The method may include, recognizing a driving purpose and combustion state by detecting driving conditions, temperature of exhaust gas at predetermined locations on an exhaust pipe, and NOx concentration contained in the exhaust gas, determining target position and timing of intake and exhaust valves by applying the driving purpose and the combustion state to a predetermined map table, controlling position and timing of the intake and exhaust valves by actuating a CVVA, detecting combustion pressure in a combustion chamber, and modifying fuel injection amount according to the combustion pressure.

17 Claims, 4 Drawing Sheets

SYSTEM FOR CONTROLLING CONTINUOUS VARIABLE VALVE LIFT ACTUATOR OF DIESEL ENGINE, AND METHOD THEREOF

CROSS-REFERENCE TO RELATED APPLICATION

The present application claims priority to Korean Patent Application No. 10-2009-0052494 filed on Jun. 12, 2009, the entire contents of which are incorporated herein for all purposes by this reference.

BACKGROUND OF THE INVENTION

1. Field of the Invention

The present invention relates to a diesel engine to which a continuously variable valve lift actuator (CVVA) is applied. More particularly, the present invention relates to a system for controlling a continuous variable valve lift actuator of a diesel engine and a method thereof that stabilizes exhaust gas and improves performance by variably controlling lift and timing of intake and exhaust valves based on a combustion state and a driving purpose.

2. Description of Related Art

Generally, an internal combustion engine burns an air-fuel mixture in a combustion chamber so as to generate power. A camshaft is driven by a timing belt connected to a crankshaft, and intake and exhaust valves are operated thereby. Air flows into the combustion chamber while the intake valve is open, and gas burned in the combustion chamber is exhausted while the exhaust valve is open.

Lift and timing of such intake and exhaust valves should be preferably controlled according to a rotation speed of an engine so as to achieve optimal engine performance.

To achieve optimal operation of the intake and exhaust valves according to the rotation speed of the engine, a cam operating the intake and exhaust valves has been researched and designed to have a plurality of shapes. Also, a continuously variable valve lift (CVVL) system that controls lift of the intake and exhaust valves to be changed according to the engine speed has been researched.

Such a CVVL system includes a drive shaft opening or closing the intake and exhaust valves, an actuator controlling the lift of the intake and exhaust valves, and a control shaft controlling the actuator together with the drive shaft so as to control the lift of the intake and exhaust valves.

There are many techniques for controlling a throttle valve in a gasoline engine so as to control exhaust gas and combustion and to enhance fuel mileage. On the contrary, there is no technique for stabilizing exhaust gas and improving combustion performance through control of the CVVL system in the diesel engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a system for controlling a continuous variable valve lift actuator of a diesel engine and a method thereof having advantages of stabilizing exhaust gas and improving performance of the diesel engine to which the CVVA is applied, as a consequence of continuously and variably controlling lift and timing of intake and exhaust valves.

In an aspect of the present invention, a system for controlling a continuous variable valve lift actuator (CCVA) of a diesel engine, may include a driving condition detecting portion that detects driving conditions of a vehicle, a temperature detecting portion that detects temperature of an exhaust gas at predetermined locations on an exhaust pipe, a nitrogen oxide (NOx) detecting portion that detects NOx concentration contained in the exhaust gas, a combustion pressure detecting portion that detects combustion pressure in a combustion chamber, a valve position detecting portion that detects positions of intake and exhaust valves, lift and timing of which are varied continuously, a control portion recognizing a driving purpose based on the driving conditions and combustion state of the engine based on the temperature of the exhaust gas and the NOx concentration, determining target position and timing of the intake and exhaust valves according to the driving purpose and the combustion state by applying a predetermined map table, and variably controlling the positions and timing of the intake and exhaust valves, and an actuator operating the intake and exhaust valves according to control signal of the control portion.

The driving condition detecting portion may include a vehicle speed sensor detecting a vehicle speed, an RPM sensor detecting a rotation speed of the diesel engine, and an accelerator pedal sensor detecting a position of an accelerator pedal.

The temperature detecting portion may include a first temperature sensor detecting temperature of the exhaust gas operating a turbocharger, a second temperature sensor detecting temperature of the exhaust gas at an inlet of a warm-up catalytic converter (WCC), a third temperature sensor detecting temperature of the exhaust gas at an inlet of a diesel particulate filter (DPF), and a fourth temperature sensor detecting temperature of the exhaust gas at a position where a reducing agent is dosed.

The NOx detecting portion may include first and second NOx sensors respectively disposed at an inlet and outlet of a selective catalytic reduction (SCR) unit.

The control portion may modify fuel injection amount according to the combustion pressure in the combustion chamber in order to stabilize the exhaust gas in a state of variably controlling the position and the timing of the intake and exhaust valves.

The control portion may control open timing of the intake valve to be fixed and controls close timing of the intake valve to be retarded so as to stabilize the exhaust gas and to enhance fuel mileage.

The control portion may control opening timing of the exhaust valve to be advanced so as to raise the temperature of the exhaust gas, to reduce time required for activating the WCC, the DPF, and the SCR unit, and to improve torque responsiveness.

The control portion may control opening timing of the exhaust valve to be retarded so as to increase an expansion ratio of the combustion chamber.

The control portion may control close timing of the exhaust valve to be advanced so as to improve cold-startability.

In another aspect of the present invention, a method for controlling a system for a continuous variable valve lift actuator (CVVA) of a diesel engine, may include recognizing driving purpose and combustion state by detecting driving conditions, a temperature of an exhaust gas at predetermined locations on an exhaust pipe, and nitrogen oxide (NOx) concentration contained in the exhaust gas, determining target position and timing of intake and exhaust valves by applying the driving purpose and the combustion state to a predetermined map table, controlling position and timing of the intake and exhaust valves by actuating the CVVA, detecting combustion pressure in a combustion chamber in a case that current position of the intake and exhaust valves corresponds to the target position thereof, and modifying fuel injection amount according to the detected combustion pressure.

The driving conditions may include a vehicle speed, a rotation speed of the engine, and a position of an accelerator pedal.

The temperature of the exhaust gas may be detected at an inlet of a turbocharger, an inlet of a warm-up catalytic converter (WCC), an inlet of a DPF (diesel particulate filter), and a position where a reducing agent is dosed.

Controlling the timing of the intake and exhaust valves may include controlling opening timing of the intake valve to be fixed and close timing of the intake valve to be retarded so as to stabilize the exhaust gas and to enhance fuel mileage, controlling opening timing of the exhaust valve to be advanced so as to raise the temperature of the exhaust gas, to reduce a time required for activating catalysts, and to improve torque responsiveness, controlling opening timing of the exhaust valve to be retarded so as to increase expansion ratio of the combustion chamber, and controlling close timing of the exhaust valve to be advances so as to improve cold-startability.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
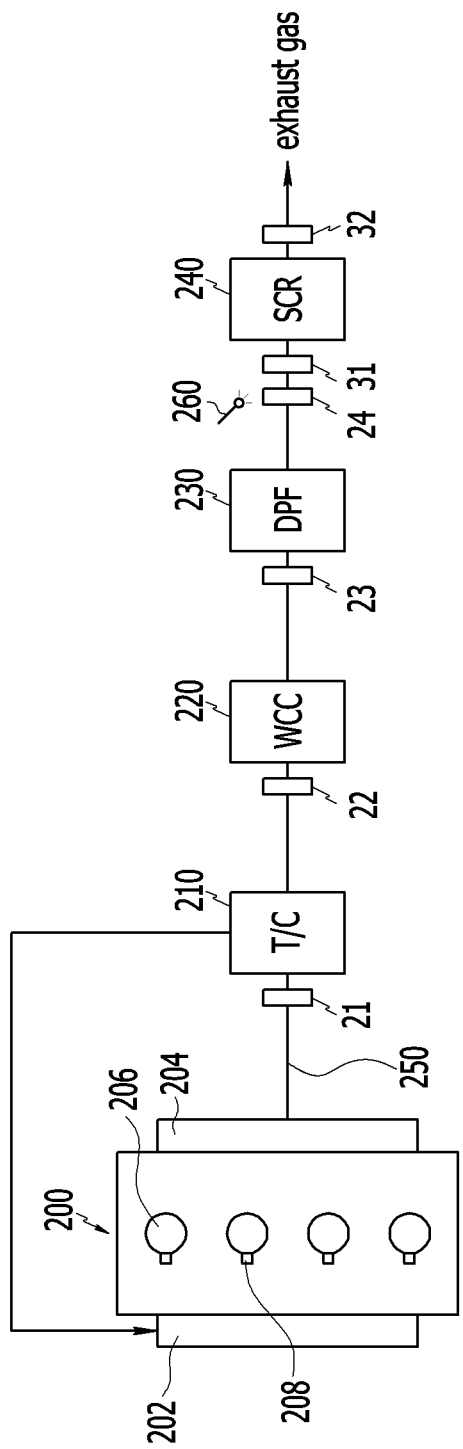
FIG. 1 is a schematic diagram of a diesel engine to which a system for controlling a CVVA according to an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a diesel engine to which a system for controlling a CVVA according to an exemplary embodiment of the present invention is applied.

As shown in FIG. 1, a diesel engine includes an engine 200, an exhaust pipe 250, a turbocharger 210, a warm-up catalytic converter (WCC) 220, a diesel particulate filter (DPF) 230, a dosing module 260, and a selective catalytic reduction (SCR) unit 240.

The engine 200 burns an air-fuel mixture in which fuel and air are mixed so as to convert chemical energy into mechanical energy. The engine 200 is connected to an intake manifold 202 so as to receive the air in a combustion chamber 206, and is connected to an exhaust manifold 204 such that exhaust gas generated in a combustion process is gathered in the exhaust manifold 204 and is exhausted to the exterior. An injector 208 is mounted in the combustion chamber 206 so as to inject the fuel into the combustion chamber 206.

The exhaust pipe 250 is connected to the exhaust manifold 204 so as to exhaust the exhaust gas to the exterior of a vehicle. The turbocharger 210, the WCC 220, the DPF 230, the dosing module 260, and the SCR 240 are sequentially mounted on the exhaust pipe 250.

The turbocharger 210 rotates a turbine by using energy of the exhaust gas so as to increase an air amount drawn into the combustion chamber 206.

The WCC 220 is mounted downstream of the turbocharger 210, and oxidizes hydrocarbon (HC) and carbon monoxide (CO) contained in the exhaust gas into carbon dioxide ($CO_2$).

The DPF 230 is mounted downstream of the WCC 220, and traps particulate matter (PM) contained in the exhaust gas.

The dosing module 260 is mounted between the DPF 230 and the SCR 240, and doses a reducing agent into the exhaust pipe 250. Generally, urea is used as the reducing agent.

The SCR 240 reduces nitrogen oxide (NOx) contained in the exhaust gas into nitrogen gas ($N_2$) by using the reducing agent dosed from the dosing module 260.

In addition, a plurality of sensors 21, 22, 23, 24, 31, and 32 for detecting driving conditions of a vehicle are mounted on the exhaust pipe 250, and will be described in detail.

Figure 2:
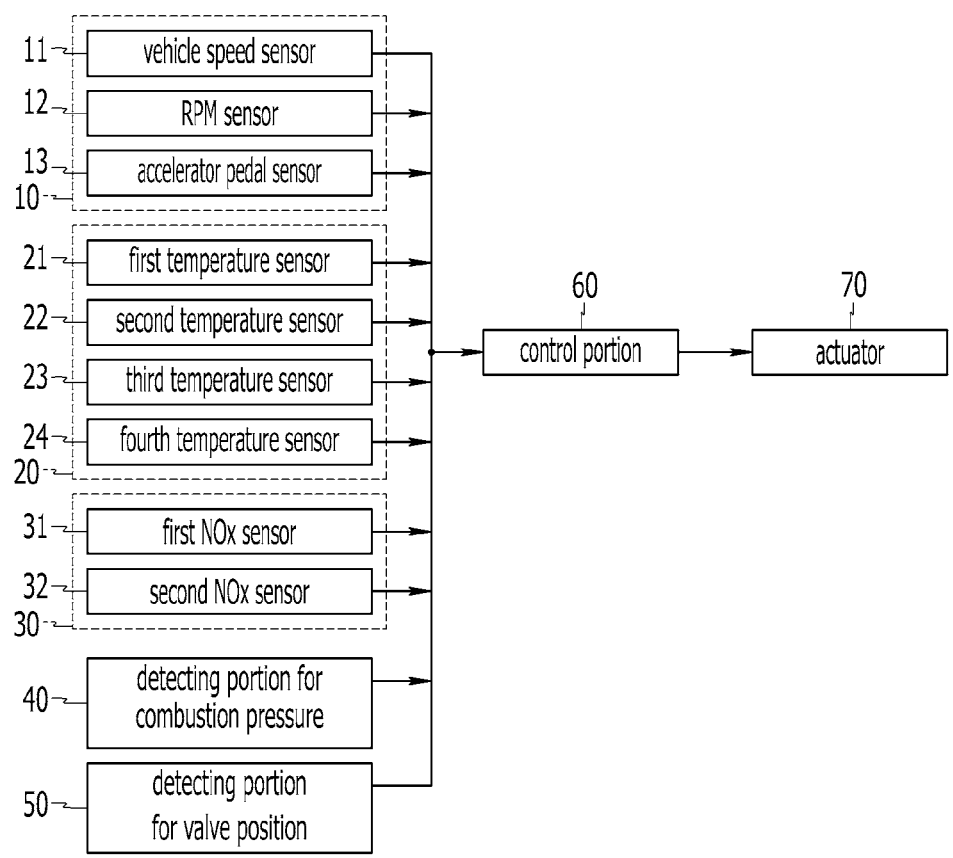
FIG. 2 is a block diagram showing a system for controlling a CVVA of a diesel engine according to an exemplary embodiment of the present invention.

FIG. 2 is a block diagram showing a system for controlling a CVVA of a diesel engine according to an exemplary embodiment of the present invention.

A system for controlling a continuous variable valve lift actuator of a diesel engine according to an exemplary embodiment of the present invention includes a driving condition detecting portion 10, a temperature detecting portion 20, a NOx detecting portion 30, a combustion pressure detecting portion 40, a valve position detecting portion 50, a control portion 60, and an actuator 70.

The driving condition detecting portion 10 detects all driving conditions, for example vehicle speed, rotation speed of the engine, a position of an accelerator pedal, and so on when the diesel vehicle according to an exemplary embodiment of the present invention is driven, and transmits information corresponding to the driving conditions to the control portion 60.

The driving condition detecting portion 10 includes a vehicle speed sensor 11 determining a current vehicle speed by detecting a rotation speed of an output shaft of a transmission, an RPM sensor 12 determining rotation speed of the engine by detecting rotation speed of a crankshaft, and an accelerator pedal sensor 13 detecting the position of the accelerator pedal that a driver operates.

The temperature detecting portion 20 detects temperature of the exhaust gas at predetermined locations on the exhaust pipe 250, and transmits information corresponding thereto to the control portion 60.

The temperature detecting portion 20 includes a first temperature sensor 21 detecting the temperature of the exhaust gas at an inlet of the turbocharger 210, a second temperature sensor 22 detecting the temperature of the exhaust gas at an inlet of the WCC 220, a third temperature sensor 23 detecting the temperature of the exhaust gas at an inlet of the DPF 230 that traps and purifies particulate matter, and a fourth temperature sensor 24 detecting the temperature of the exhaust gas at an inlet of the SCR 240 at which the reducing agent is dosed.

The NOx detecting portion 30 detects concentration of NOx contained in the exhaust gas and transmits information corresponding thereto to the control portion 60.

The NOx detecting portion 30 includes a first NOx sensor 31 that detects NOx concentration contained in the exhaust gas at the inlet of the SCR 240, and a second NOx sensor 32 that detects NOx concentration contained in the exhaust gas at an outlet of the SCR 240.

The combustion pressure detecting portion 40 is disposed close to a glow plug, and detects combustion pressure of each combustion chamber 206 and transmits information corresponding thereto to the control portion 60.

The valve position detecting portion 50 detects positions of intake and exhaust valves, lift and timing of which are continuously changed by operation of the actuator (e.g., CVVA), and transmits information corresponding thereto to the control portion 60.

The control portion 60 recognizes a driving purpose based on the driving conditions of the vehicle, and recognizes a combustion state of the engine 200 based on the temperature of the exhaust gas detected at the predetermined locations of the exhaust pipe 250 and the NOx concentration contained in the exhaust gas. The control portion 60 determines target lift position and timing of the intake and exhaust valves by applying the driving purpose and the combustion state to a predetermined map table, and drives the actuator 70 to control the position and timing of the intake and exhaust valves.

In addition, in a state of controlling the position and the timing of the intake and exhaust valves, the control portion 60 modifies fuel injection amount according to the combustion pressure of each combustion chamber 206 so as to stabilize the exhaust gas and improve engine performance.

In the control of the position and the timing of the intake and exhaust valves, the control portion 60 controls open timing of the intake valve to be fixed and controls close timing of the intake valve to be advanced or retarded. In addition, the control portion 60 controls opening and close timing of the exhaust valve to be advanced or retarded.

The actuator 70 operates the CVVL by controlling hydraulic pressure or a motor according to control signals received from the control portion 70 so as to control the position and the timing of the intake and exhaust valves.

Figure 3:
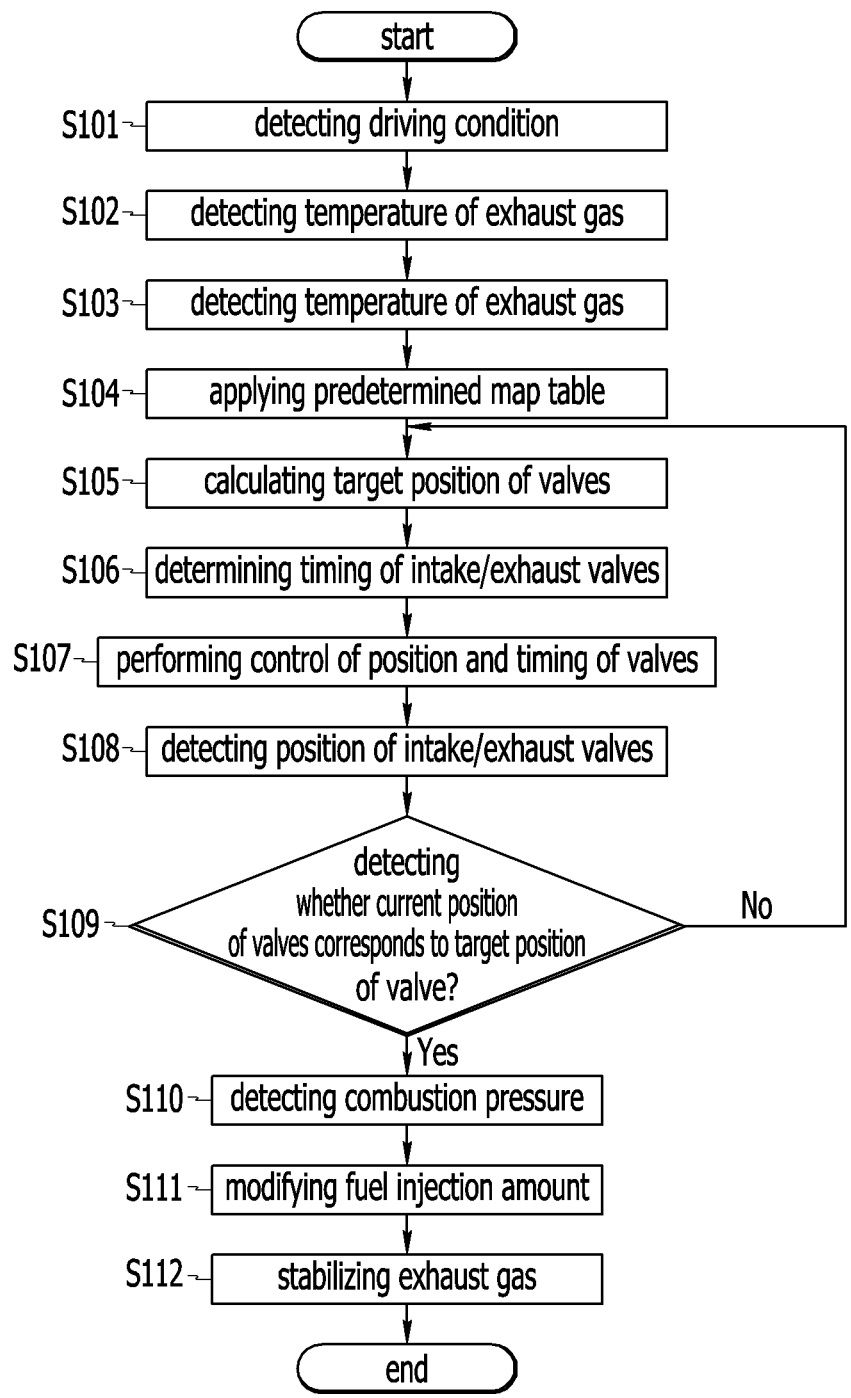
FIG. 3 is a flowchart of a method for controlling a CVVA of a diesel engine according to an exemplary embodiment of the present invention.

According to the exemplary embodiment of the present invention, the position and the timing of the intake and exhaust valves are variably controlled through control of the CVVA, and a detailed description thereof follows When the diesel engine vehicle according to the exemplary embodiment of the present invention is driven, the control portion 60 receives the driving conditions including the vehicle speed, the rotation speed of the engine, and the position of the accelerator pedal from the driving condition detecting portion 10 at step S101 in FIG. 3, receives the temperature of the exhaust gas supplied to the turbocharger 210, the temperature of the exhaust gas at the inlet of the WCC 220, the temperature of the exhaust gas at the inlet of the DPF 230, and the temperature of the exhaust gas at the inlet of the SCR 240 from sensors of the temperature detecting portion 20 mounted at predetermined locations of the exhaust pipe 250 at step S102, and receives the NOx concentration contained in the exhaust gas supplied to the SCR 240 and the NOx concentration contained in the exhaust gas passing through the SCR 240 from the NOx detecting portion 30 at step S103.

After that, the control portion 60 recognizes the driving purpose based on the driving conditions, and recognizes the combustion state based on the temperature and the NOx concentration of the exhaust gas. Then, the control portion 60 applies the driving purpose and the combustion state to the predetermined map table at step S104, calculates the target position of the intake and exhaust valves at step S105, and determines the open and close timing of the intake and exhaust valves at step S106.

As described above, if the target position and the timing of the intake and exhaust valves are determined, the control portion 60 operates the actuator 70 to variably control the position and the timing of the intake and exhaust valves at step S107.

In a state in which the position and the timing of the intake and exhaust valves are variably controlled as described above, the valve position detecting portion 50 detects the position of the intake and exhaust valves at step S108, and the control portion 60 determines whether a target position control is normally controlled at step S109.

If the target position control is not controlled normally at step S109, the method according to the exemplary embodiment of the present invention is returned to step S105, and the variable control of the positions of the intake and exhaust valves is continuously performed by modifying the positions of the intake and exhaust valves.

If the target position control is controlled normally at step S109, the combustion pressure detecting portion 40 disposed close to the glow plug of each combustion chamber 206 detects the combustion pressure of each combustion chamber 206 at step S110, and the control portion 60 modifies the fuel injection amount according to the combustion pressure at step S111. Therefore, the NOx concentration is minimized and the exhaust gas is stabilized at step S112.

Figure 4:
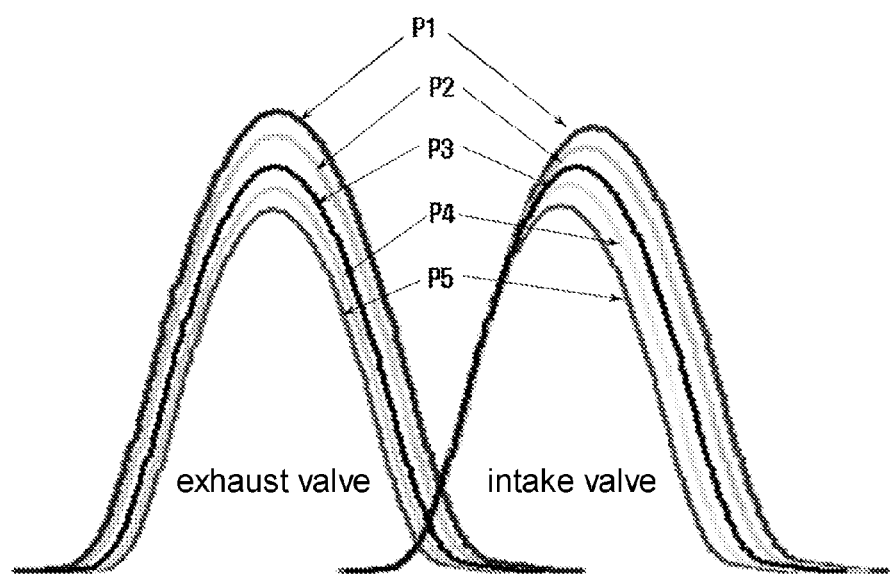
FIG. 4 is a graph showing control positions of intake and exhaust valves according to an exemplary embodiment of the present invention.

The position and the timing of the intake and exhaust valves are varied from P1 to P5 by the operation of the actuator 70 according to the control of the control portion 60, as shown in FIG. 4. More concretely, the open timing of the intake valve is fixed and the close timing of the intake valve is retarded so as to stabilize the exhaust gas and improve fuel mileage.

In addition, the open timing of the exhaust valve is advanced so as to raise the temperature of the exhaust gas, to reduce a time required for activating the catalysts, and to improve torque responsiveness, and the open timing of the exhaust valve is retarded so as to improve expansion ratio of the combustion chamber 206 and fuel mileage. Also, the close timing of the exhaust valve is advanced to improve cold-startability.

According to an exemplary embodiment of the present invention, engine performance may be improved and exhaust gas may be stabilized through variable control of a CVVA according to driving conditions and a driving purpose of a driver.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling a continuous variable valve lift actuator (CCVA) of a diesel engine, comprising:
 a driving condition detecting portion that detects driving conditions of a vehicle;
 a temperature detecting portion that detects temperature of an exhaust gas at predetermined locations on an exhaust pipe;
 a nitrogen oxide (NOx) detecting portion that detects NOx concentration contained in the exhaust gas;
 a combustion pressure detecting portion that detects combustion pressure in a combustion chamber;
 a valve position detecting portion that detects positions of intake and exhaust valves, lift and timing of which are varied continuously;
 a control portion recognizing a driving purpose based on the driving conditions and combustion state of the engine based on the temperature of the exhaust gas and the NOx concentration, determining target position and timing of the intake and exhaust valves according to the driving purpose and the combustion state by applying a predetermined map table, and variably controlling the positions and timing of the intake and exhaust valves; and
 an actuator operating the intake and exhaust valves according to control signal of the control portion.

2. The system of claim 1, wherein the driving condition detecting portion includes:
 a vehicle speed sensor detecting a vehicle speed;
 an RPM sensor detecting a rotation speed of the diesel engine; and
 an accelerator pedal sensor detecting a position of an accelerator pedal.

3. The system of claim 1, wherein the temperature detecting portion includes:
 a first temperature sensor detecting temperature of the exhaust gas operating a turbocharger;
 a second temperature sensor detecting temperature of the exhaust gas at an inlet of a warm-up catalytic converter (WCC);
 a third temperature sensor detecting temperature of the exhaust gas at an inlet of a diesel particulate filter (DPF); and
 a fourth temperature sensor detecting temperature of the exhaust gas at a position where a reducing agent is dosed.

4. The system of claim 1, wherein the NOx detecting portion includes first and second NOx sensors respectively disposed at an inlet and outlet of a selective catalytic reduction (SCR) unit.

5. The system of claim 1, wherein the control portion modifies fuel injection amount according to the combustion pressure in the combustion chamber in order to stabilize the exhaust gas in a state of variably controlling the position and the timing of the intake and exhaust valves.

6. The system of claim 1, wherein the control portion controls open timing of the intake valve to be fixed and controls close timing of the intake valve to be retarded so as to stabilize the exhaust gas and to enhance fuel mileage.

7. The system of claim 1, wherein the control portion controls opening timing of the exhaust valve to be advanced so as to raise the temperature of the exhaust gas, to reduce time required for activating the WCC, the DPF, and the SCR unit, and to improve torque responsiveness.

8. The system of claim 1, wherein the control portion controls opening timing of the exhaust valve to be retarded so as to increase an expansion ratio of the combustion chamber.

9. The system of claim 1, wherein the control portion controls close timing of the exhaust valve to be advanced so as to improve cold-startability.

10. A method for controlling the system for the continuous variable valve lift actuator (CCVA) of claim 1, comprising:
 recognizing driving purpose and combustion state by detecting the driving conditions, the temperature of the exhaust gas at the predetermined locations on the exhaust pipe, and the NOx concentration contained in the exhaust gas;
 determining target position and timing of the intake and exhaust valves by applying the driving purpose and the combustion state to a predetermined map table;
 controlling position and timing of the intake and exhaust valves by actuating the CVVA;
 detecting combustion pressure in the combustion chamber in a case that current positions of the intake and exhaust valves correspond to the target position there; and
 modifying fuel injection amount according to the detected combustion pressure.

11. The method of claim 10, wherein the driving conditions include a vehicle speed, a rotation speed of the engine, and a position of an accelerator pedal.

12. The method of claim 10, wherein the temperature of the exhaust gas is detected at an inlet of a turbocharger, an inlet of a warm-up catalytic converter (WCC), an inlet of a DPF (diesel particulate filter), and a position where a reducing agent is dosed.

13. The method of claim 10, wherein controlling the timing of the intake and exhaust valves includes:
 controlling opening timing of the intake valve to be fixed and close timing of the intake valve to be retarded so as to stabilize the exhaust gas and to enhance fuel mileage;
 controlling opening timing of the exhaust valve to be advanced so as to raise the temperature of the exhaust gas, to reduce a time required for activating catalysts, and to improve torque responsiveness;
 controlling opening timing of the exhaust valve to be retarded so as to increase expansion ratio of the combustion chamber; and
 controlling close timing of the exhaust valve to advance so as to improve cold-startability.

14. A method for controlling a system for a continuous variable valve lift actuator (CVVA) of a diesel engine, comprising:
 recognizing driving purpose and combustion state by detecting driving conditions, a temperature of an exhaust gas at predetermined locations on an exhaust pipe, and nitrogen oxide (NOx) concentration contained in the exhaust gas;
 determining target position and timing of intake and exhaust valves by applying the driving purpose and the combustion state to a predetermined map table;
 controlling position and timing of the intake and exhaust valves by actuating the CVVA;

detecting combustion pressure in a combustion chamber in a case that current position of the intake and exhaust valves corresponds to the target position thereof; and modifying fuel injection amount according to the detected combustion pressure.

15. The method of claim 14, wherein the driving conditions include a vehicle speed, a rotation speed of the engine, and a position of an accelerator pedal.

16. The method of claim 14, wherein the temperature of the exhaust gas is detected at an inlet of a turbocharger, an inlet of a warm-up catalytic converter (WCC), an inlet of a DPF (diesel particulate filter), and a position where a reducing agent is dosed.

17. The method of claim 14, wherein controlling the timing of the intake and exhaust valves includes:

controlling opening timing of the intake valve to be fixed and close timing of the intake valve to be retarded so as to stabilize the exhaust gas and to enhance fuel mileage;

controlling opening timing of the exhaust valve to be advanced so as to raise the temperature of the exhaust gas, to reduce a time required for activating catalysts, and to improve torque responsiveness;

controlling opening timing of the exhaust valve to be retarded so as to increase expansion ratio of the combustion chamber; and controlling close timing of the exhaust valve to be advanced so as to improve cold-startability.

\* \* \* \* \*